(12) United States Patent
Ouyang et al.

(10) Patent No.: US 12,436,445 B1
(45) Date of Patent: Oct. 7, 2025

(54) TRIGGER WITH CHARGING EFFECT

(71) Applicant: SHENZHEN MINGMEI MOBILE TECHNOLOGY CO., LTD, Guangdong (CN)

(72) Inventors: Jun Ouyang, Guangdong (CN); Yuanchao Mo, Guangdong (CN); Yong Li, Guangdong (CN)

(73) Assignee: SHENZHEN MINGMEI MOBILE TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/954,710

(22) Filed: Nov. 21, 2024

(51) Int. Cl.
*G03B 7/20* (2021.01)
*G03B 7/26* (2021.01)
*H05K 5/10* (2025.01)
*H05K 7/14* (2006.01)

(52) U.S. Cl.
CPC .............. *G03B 7/26* (2013.01); *H05K 5/10* (2025.01); *H05K 7/1427* (2013.01)

(58) Field of Classification Search
CPC ....................................................... G03B 7/26
See application file for complete search history.

(56) References Cited

U.S. PATENT DOCUMENTS

| | | | | |
|---|---|---|---|---|
| 5,914,481 A * | 6/1999 | Danielson | | G06F 3/04886 235/462.15 |
| 6,085,040 A * | 7/2000 | Yasukawa | | G03B 7/16 396/61 |
| 10,594,845 B2 * | 3/2020 | Hébert | | H04M 1/0249 |
| 2004/0036774 A1 * | 2/2004 | Nichols | | H04N 1/212 348/371 |
| 2010/0327654 A1 * | 12/2010 | Azuma | | H05K 7/1432 307/9.1 |
| 2011/0279661 A1 * | 11/2011 | Pan Ho | | H04N 7/183 348/61 |
| 2012/0033959 A1 * | 2/2012 | King | | G03B 15/02 396/164 |
| 2012/0118773 A1 * | 5/2012 | Rayner | | A45C 13/002 206/320 |
| 2012/0154627 A1 * | 6/2012 | Rivard | | H04N 23/88 348/E9.051 |
| 2012/0237197 A1 * | 9/2012 | Iwatani | | G03B 17/02 396/535 |
| 2016/0234356 A1 * | 8/2016 | Thomas | | H04K 3/84 |
| 2022/0338670 A1 * | 10/2022 | Swift | | H05B 3/36 |
| 2023/0261413 A1 * | 8/2023 | Fischell | | H01R 13/443 439/271 |
| 2024/0057622 A1 * | 2/2024 | Snyder | | A22B 3/083 |
| 2024/0347963 A1 * | 10/2024 | Schipper | | B26B 19/3853 |

* cited by examiner

*Primary Examiner* — Allen L Parker
*Assistant Examiner* — Douglas R Burtner

(57) ABSTRACT

The disclosure relates to a trigger with a charging effect in the field of triggers, which includes an enclosure and a circuit board, wherein the battery is connected to the circuit board. According to the trigger with the charging effect, the battery is arranged in the enclosure, so that the trigger can be used normally while having a triggering function; and meanwhile, the battery supplies power to the camera to achieve a charging function of the trigger, thereby avoiding the situation that a power supply needs to be installed additionally to supply power to the trigger and the camera when the trigger is used, thereby providing convenience for the user, and improving the user's sense of experience.

9 Claims, 3 Drawing Sheets

TRIGGER WITH CHARGING EFFECT

TECHNICAL FIELD

The disclosure relates to the field of triggers, in particular to a trigger with a charging effect.

BACKGROUND ART

A trigger, which functions as an auxiliary apparatus in photographic equipment, is generally used in a studio with various flash lamps.

The trigger is installed on a camera to control the flash lamp in a light, wired or wireless manner, so that the flash time of the flash lamp is synchronized with a shutter of the camera, thereby achieving an effect of synchronous operation. In order to achieve good photographic effects during shooting, most professional cameras are equipped with an external flash lamp, which is connected to the trigger by means of radio, an optical cable, infrared rays or direct circuit connection. When an operator presses the shutter of the camera in the event of taking a picture, the camera transmits a triggering signal to the flash lamp through an output electrode, so that the flash lamp works synchronously.

The existing trigger still has the following problems: when a triggering function of the trigger is used, a power supply is usually arranged in the camera to supply power to the trigger and the camera, but the trigger cannot be used independently, which is easy to bring inconvenience to the user.

SUMMARY OF THE INVENTION

An object of the disclosure is to solve the above defects, and provide a trigger with a charging effect, which can provide an external power supply for a camera while achieving the independent use of the trigger, thereby longer working time of the camera.

The object of the disclosure is achieved in the following mode: a trigger with a charging effect includes an enclosure and a circuit board, wherein the circuit board is arranged inside the enclosure; a top surface of the enclosure is provided with a transmission port; a side surface of the enclosure is provided with a switch, an interface and an indicator window; one ends of the switch, the transmission port, the indicator window and the interface extend into the enclosure and are connected to the circuit board; and a battery is arranged inside the enclosure, and connected to the circuit board.

In the above description, as a further scheme, the side surface of the enclosure is provided with a waterproof jacket for waterproofing the interface, and provided with an opening, the interface is formed inside the opening, one end of the waterproof jacket penetrates into the opening, and the other end of the waterproof jacket covers the opening.

In the above description, as a further scheme, the enclosure includes an upper housing and a lower housing, wherein the upper housing and the lower housing are connected through a fastener.

In the above description, as a further scheme, the upper housing is provided with a clamping slot, and the lower housing is provided with a clamping strip for matching with the clamping slot.

In the above description, as a further scheme, a side surface of the lower housing is provided with a fixed block, and a gap is left between the fixed block and the lower housing.

In the above description, as a further scheme, a model of the interface is TYPE-C.

The beneficial effects brought by the disclosure are as follows: in the trigger with the charging effect, the battery is arranged in the enclosure, so that the trigger can be used normally while having a triggering function; and meanwhile, the battery supplies power to the camera to achieve a charging function of the trigger, thereby avoiding the situation that a power supply needs to be mounted additionally to supply power to the trigger and the camera when the trigger is used, thereby providing convenience for the user, and improving the user's sense of experience.

Figure 1:
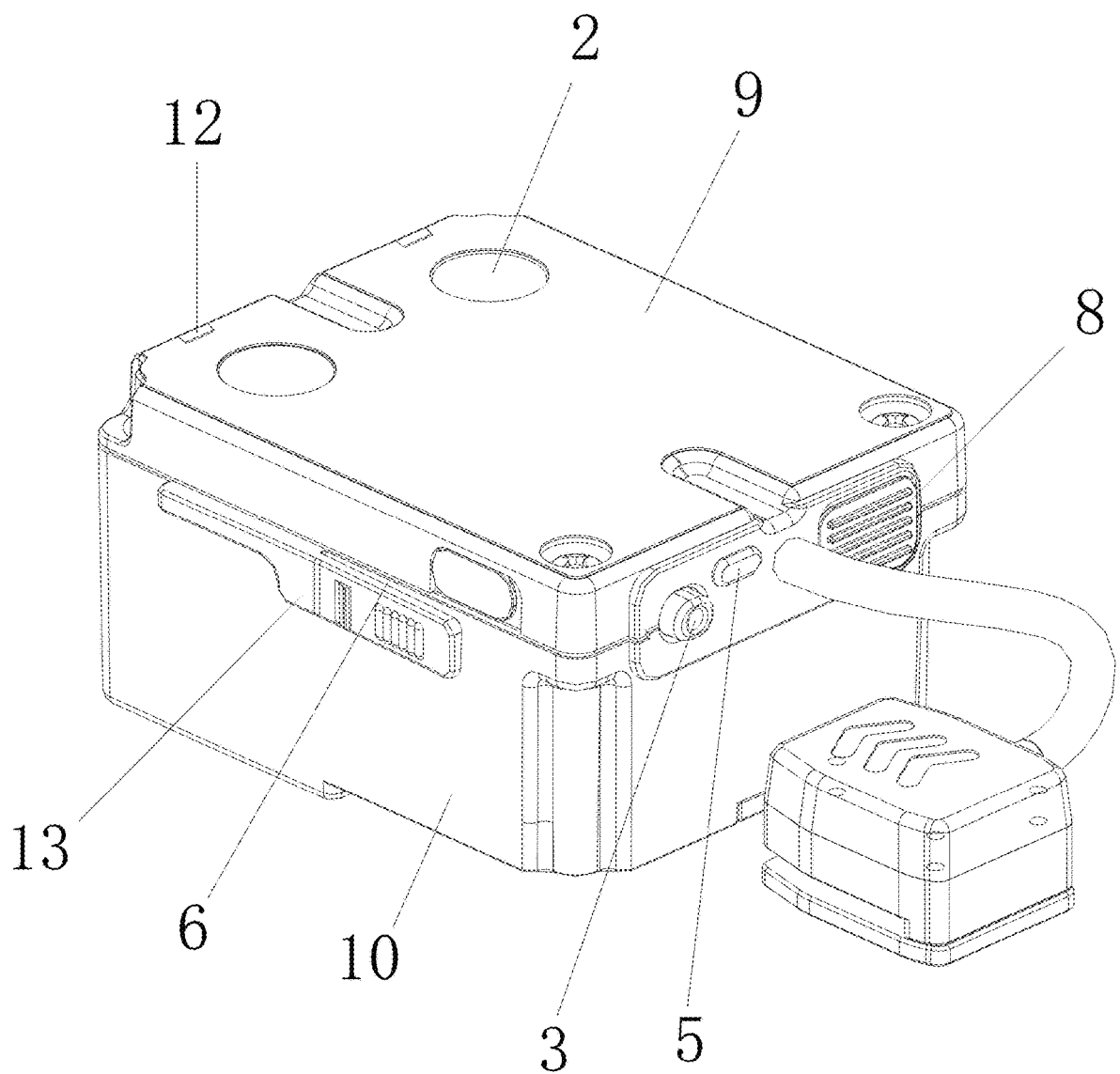
FIG. 1 is a schematic perspective view of a trigger having a charging effect in the disclosure.

In the drawings: 1-circuit board; 2-transmission port; 3-switch; 4-interface; 5-indicator window; 6-gap; 7-battery; 8-waterproof jacket; 9-upper housing; 10-lower housing; 11-clamping slot; 12-clamping strip; and 13-fixed block.

DETAILED DESCRIPTION OF THE INVENTION

The disclosure will be further described below in conjunction with the accompanying drawings. The embodiments described with reference to the accompanying drawings are exemplary, and are intended to explain the present application, rather than being construed as limitations to the present application. In the description of the present application, it should be understood that the orientation or position relations indicated via terms of "central", "longitudinal", "transverse", "length", "width", "thickness", "upper", "lower", "front", "rear", "left", "right", "vertical" "horizontal", "top", "bottom", "inner", "outer", "clockwise", "anticlockwise" and the like are based on orientation or the position relations shown in the drawings only to describe the present application conveniently and simplify the description, but not indicate or imply that referred devices or elements must have particular orientations or be constructed and operated with the particular orientation, so that they cannot be construed as limiting of the disclosure. Moreover, the terms "first" and "second" are only for the purpose of description and should not be construed as indicating or implying relative importance or implicitly indicating the number of technical features indicated. Thus, the features defined by the terms "first" and "second" may include one or more of the features either explicitly or implicitly. In the description of the present application, unless otherwise definitely limited, the term "several" or "a plurality of" means two or more. In the present application, unless otherwise definitely specified and limited, the terms "mounted", "connected with each other", "connected to/with", "fixed", and the like need to be broadly understood, for example, connection may be fixed connection, or detachable connection or integrated connection; or may be mechanical connection, or electrical connection; or may be direct connection, or indirect connection via an intermediation, or communication of inner parts of two elements. A person of ordinary skill in the art can understand the specific meaning of the above terms in the disclosure in accordance with specific conditions. In the present application, unless otherwise definitely specified and limited, a first feature being provided "above" or "below" a second feature may mean that the first feature is in direct contact with the second feature, or mean that the first and second features are not in direct contact, but via other additional feature therebetween. Moreover, the first feature being provided "over", "above", and "on" the second feature may mean that the first feature is provided directly above or diagonally above the second feature, or merely means that a level of the first feature is higher than the second feature. The first feature being provided "under", "below", and "beneath" the second feature may include that the first feature is provided directly below or diagonally below the second feature, merely means that a level of the first feature is lower than the second feature.

Figure 2:
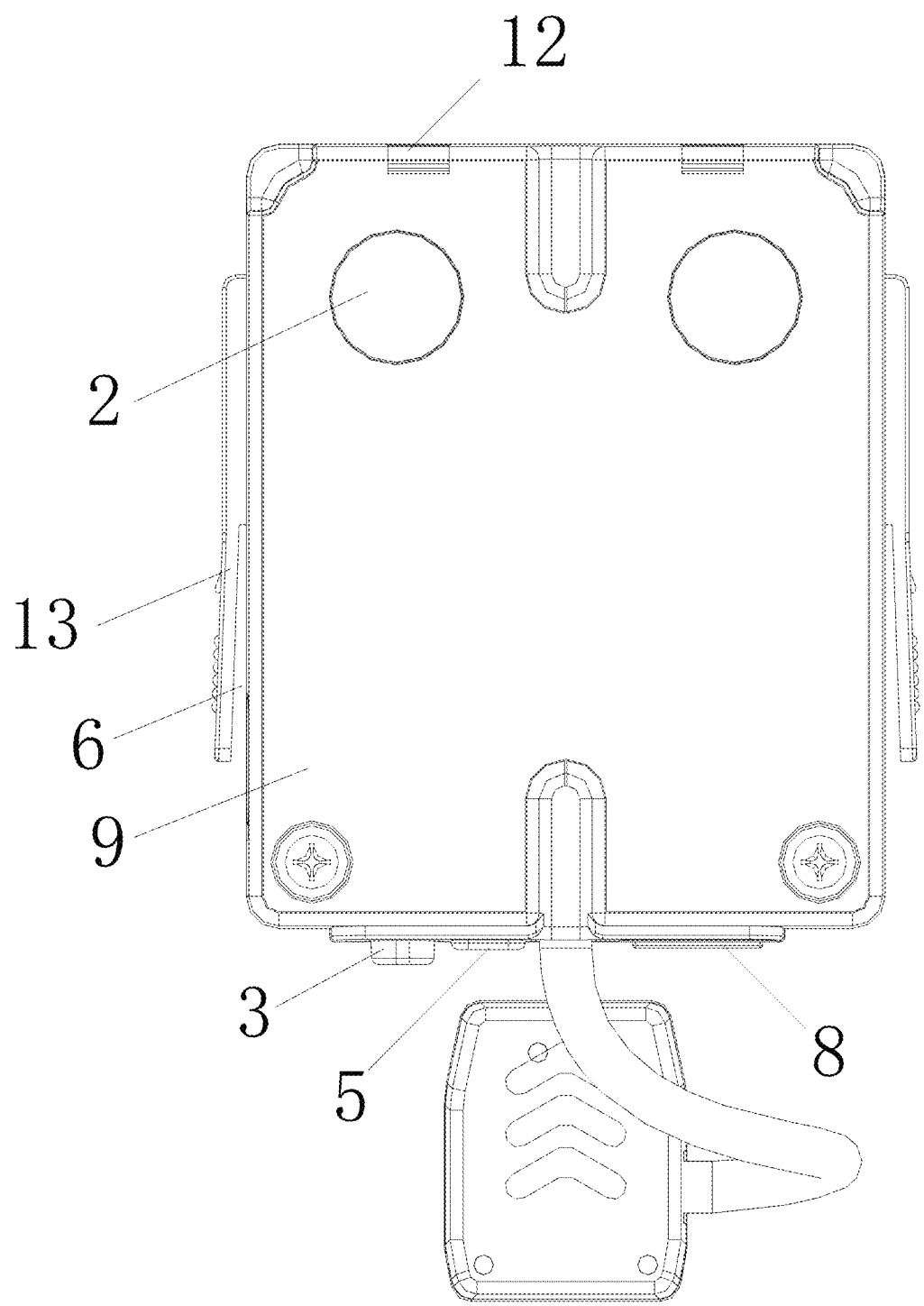
FIG. 2 is a main view of a trigger having a charging effect in the disclosure.
Figure 3:
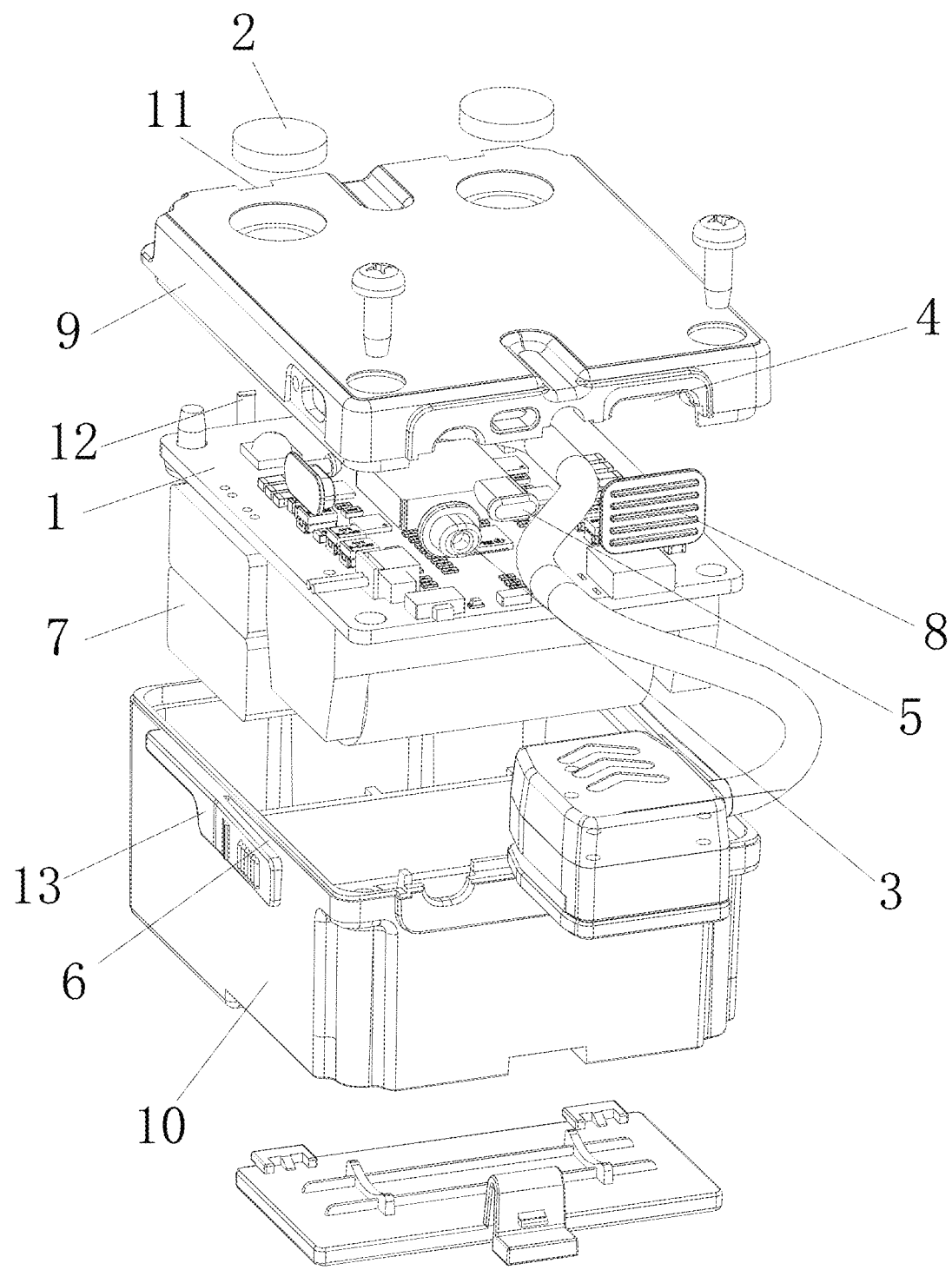
FIG. 3 is an exploded view of a trigger having a charging effect in the disclosure.

Referring to FIGS. 1-3, a trigger with a charging effect is specifically implemented. The trigger includes an enclosure and a circuit board 1. The circuit board 1 is arranged inside the enclosure. A top surface of the enclosure is provided with a transmission port 2. The transmission port 2 is used for transmitting electrical signals. A side surface of the enclosure is provided with a switch 3, an interface 4 and an indicator window 5. The switch 3, the transmission port 2, the indicator window 5 and the interface 4 extend into the enclosure and are connected to the circuit board 1. A battery 7 is arranged inside the enclosure and connected to the circuit board 1. The battery 7 supplies power to the trigger and also the camera. If the battery 7 is out of power, the interface 4 may be exposed to the outside, and a data line is then used to be plugged with the interface 4 to charge the trigger.

In this embodiment, through the design of the circuit, a charging circuit of the trigger is connected to the circuit board of the camera. When a shutter of the camera is pressed, the charging circuit is triggered to supply power to the camera while a triggering signal sent by a hot shoe triggers the trigger to work.

Specifically, the side surface of the enclosure is provided with the waterproof jacket 8 for waterproofing the interface 4, and provided with an opening. The interface 4 is formed inside the opening. One end of the waterproof jacket 8 penetrates into the opening and fits outside the interface 4, and the other end of the waterproof jacket 8 covers the opening.

Specifically, the enclosure includes an upper housing 9 and a lower housing 10. The upper housing 9 and the lower housing 10 are connected through a fastener. The fastener may be a screw. The screw is forcefully tightened, so that the upper housing 9 and the lower housing 10 are connected more closely.

Specifically, the upper housing 9 is provided with a clamping slot 11, the lower housing 10 is provided with a clamping strip 12 for matching with the clamping slot 11, and the clamping slot 11 is matched with the clamping strip 12, such that the fit degree between the upper housing 9 and the lower housing 10 is improved, and the upper housing 9 and the lower housing 10 are connected more closely.

Specifically, a side surface of the lower housing 10 is provided with a fixed block 13, and a gap 6 is left between the fixed block 13 and the lower housing 10. The fixed block 13 and the gap 6 form a structural design of the uniquely installed clamping slot 11, so no screw is required for a fixing purpose. When the trigger is installed into the camera, the fixed block 13 is directly installed into a matching groove in the camera, so no screw is used, thereby the assembly time.

In this embodiment, a model of the interface 4 is TYPE-C, and the interface 4 may also be an Android model.

In the disclosure, a use mode in this embodiment is as follows: when the external power supply is used to charge the trigger, the interface 4 is first exposed, and then the interface 4 is electrically connected to the external power supply; after charging, the interface 4 is electrically connected to the interior to the camera, and then the camera is covered well; and the camera is then put into water again to continue shooting, so that the shooting is achieved while charging, thereby saving the time and improving the efficiency.

The trigger of the disclosure not only makes the camera have a triggering function, but also supplies power to the camera, or other equipment inside a diving shell, and the installation is convenient. In the disclosure, the fixed block 13 is fixedly plugged with the camera, and this fixing mode is simple, stable and reliable.

The above content is a further detailed description of the present utility in conjunction with specific further embodiments, but it cannot be regarded that the specific embodiments of the disclosure are limited to these descriptions. For a person of ordinary skill in the art to which the disclosure belongs, without departing from the idea of the disclosure, a number of simple deductions or replacements may be made, which should be regarded as falling within the protection scope of the disclosure.

The invention claimed is:

1. A trigger with a charging effect, comprising an enclosure and a circuit board (1), wherein the circuit board (1) is arranged inside the enclosure; a top surface of the enclosure is provided with a transmission port (2) used for transmitting signals; a side surface of the enclosure is provided with an interface (4); one ends of the transmission port (2) and the interface (4) extend into the enclosure and are connected to the circuit board (1); and a battery (7) is arranged inside the enclosure, and connected to the circuit board (1), wherein the interface (4) is configurable to be electrically connected to an external power supply or a camera; in response to the interface (4) be electrically connected to the external power supply, the trigger is charged by the external power supply; and in response to the interface (4) be electrically connected to the camera and a triggering signal being received, the circuit board (1) is triggered to supply power to the camera through the interface (4);

wherein the triggering signal is received from a hot shoe of the camera.

2. The trigger with the charging effect according to claim 1, wherein the side surface of the enclosure is provided with a switch and an indicator window, and one ends of the switch and the indicator window extend into the enclosure and are connected to the circuit board.

3. The trigger with the charging effect according to claim 1, wherein the side surface of the enclosure is provided with a waterproof jacket for waterproofing the interface, and provided with an opening; the interface is formed inside the opening; and one end of the waterproof jacket penetrates into the opening, and the other end of the waterproof jacket covers the opening.

4. The trigger with the charging effect according to claim 3, wherein the enclosure comprises an upper housing and a lower housing, and the upper housing and the lower housing are connected through a fastener.

5. The trigger with the charging effect according to claim 4, wherein the upper housing is provided with a clamping slot, and the lower housing is provided with a clamping strip for matching with the clamping slot.

6. The trigger with the charging effect according to claim 5, wherein a side surface of the lower housing is provided with a fixed block, and a gap is left between the fixed block and the lower housing.

7. The trigger with the charging effect according to claim 3, wherein a model of the interface is TYPE-C.

8. The trigger with the charging effect according to claim 1, wherein the enclosure comprises an upper housing and a lower housing, and the upper housing and the lower housing are connected through a fastener.

9. The trigger with the charging effect according to claim 1, wherein a model of the interface is TYPE-C.

* * * * *